United States Patent
Kashitani (10) Patent No.: US 9,662,581 B2
(45) Date of Patent: May 30, 2017

(54) VIDEO GAME PROCESSING APPARATUS AND VIDEO GAME PROCESSING PROGRAM

(71) Applicant: KABUSHIKI KAISHA SQUARE ENIX, Shibuya-ku (JP)

(72) Inventor: Yoshiki Kashitani, Shibuya-ku (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 241 days.

(21) Appl. No.: 13/623,999

(22) Filed: Sep. 21, 2012

(65) Prior Publication Data

US 2013/0079155 A1 Mar. 28, 2013

(30) Foreign Application Priority Data

Sep. 22, 2011 (JP) .................................. 2011-207803

(51) Int. Cl.
*A63F 9/24* (2006.01)
*A63F 13/49* (2014.01)
(Continued)

(52) U.S. Cl.
CPC ............ *A63F 13/49* (2014.09); *A63F 13/493* (2014.09); *A63F 13/497* (2014.09);
(Continued)

(58) Field of Classification Search
CPC .......... A63F 13/00; A63F 13/06; A63F 13/10; A63F 13/45; A63F 13/47; A63F 13/79
(Continued)

(56) References Cited

U.S. PATENT DOCUMENTS 6,371,856 B1   4/2002 Niwa
6,398,650 B1 * 6/2002 Horigami et al. .............. 463/43
(Continued)

FOREIGN PATENT DOCUMENTS

EP        2138211      12/2009
JP        2003-245470   9/2003
JP        A2007-111318  5/2007

OTHER PUBLICATIONS

Chrono Trigger Manual, SNES, Mar. 11, 1995, Developed by Square.*

(Continued)

*Primary Examiner* — William H McCulloch, Jr.
*Assistant Examiner* — Chase Leichliter
(74) *Attorney, Agent, or Firm* — Greenblum & Bernstein, P.L.C.

(57) ABSTRACT

Player character related information stored in a player character related information memory changes in accordance with progress of a video game. Initial area information stored in an initial area information memory indicates an initial state of each of a plurality of areas on which a player character can move. Latest area information stored in a latest area information memory indicates a progress status of the video game in the same area as the area indicated by the initial area information, and is updated in accordance with progress of the video game in the area. It is determined whether to use the initial area information or latest area information in response to an operation of the player. The player character related information is updated in accordance with control content using the latest area information in a case where it is determined to use the latest area information.

20 Claims, 8 Drawing Sheets (51) Int. Cl.
*A63F 13/497* (2014.01)
*A63F 13/822* (2014.01)
*A63F 13/493* (2014.01)
*A63F 13/58* (2014.01)
*A63F 13/00* (2014.01)
*A63F 13/79* (2014.01)
*A63F 13/47* (2014.01)
*A63F 13/45* (2014.01)

(52) U.S. Cl.
CPC ............ *A63F 13/822* (2014.09); *A63F 13/00* (2013.01); *A63F 13/45* (2014.09); *A63F 13/47* (2014.09); *A63F 13/58* (2014.09); *A63F 13/79* (2014.09); *A63F 2300/554* (2013.01); *A63F 2300/5526* (2013.01); *A63F 2300/5533* (2013.01); *A63F 2300/636* (2013.01); *A63F 2300/65* (2013.01); *A63F 2300/807* (2013.01)

(58) Field of Classification Search
USPC .................................. 463/43, 1–9, 42, 30–38
See application file for complete search history.

(56) References Cited

U.S. PATENT DOCUMENTS

| | | | | |
|---|---|---|---|---|
| 7,780,533 | B2* | 8/2010 | Yamauchi et al. | 463/42 |
| 8,298,079 | B2* | 10/2012 | Mori | 463/30 |
| 2002/0137557 | A1 | 9/2002 | Ishii et al. | |
| 2002/0198046 | A1* | 12/2002 | Nakazawa | A63F 13/10 463/31 |
| 2004/0259636 | A1* | 12/2004 | Machida | 463/30 |
| 2007/0010325 | A1* | 1/2007 | Suzuki et al. | 463/31 |
| 2007/0207860 | A1* | 9/2007 | Yamauchi et al. | 463/42 |
| 2007/0265046 | A1* | 11/2007 | Sato | A63F 13/10 463/8 |
| 2008/0026847 | A1* | 1/2008 | Mueller | A63F 13/822 463/42 |

OTHER PUBLICATIONS

Chrono Trigger Map, SNES, Mar. 11, 1995, Developed by Square.*
Chrono Trigger Manual, NDS, Nov. 25, 2008, Developed by Square.*
"Radiant Historia", FAMITSU, Nov. 10, 2010, (Enterbrain, Inc., Nov. 4, 2010, vol. 25, No. 46, pp. 121-126).
"Tactics Ogre: Let Us Cling Together, Legendry Ogre Battle", Dengeki Games, vol. 13, Dengeki Nintendo DS, the Nov. extra number, (ASCII Media Works Inc., Sep. 24, 2010, vol. 10, No. 22, pp. 44, 52). (with English translation).
Qbist Inc., "SE-MOOK, Tactics Ogre: Let Us Cling Together, Official Complete Guide", ($5^{th}$ Edition, Square Enix Co., Ltd., Mar. 16, 2011, pp. 482). (with English translation).
"Tactics Ogre: Let Us Cling Together", GEMAGA, 2010, the Oct., (Softbank Creative Corp., Oct. 1, 2010, vol. 27, No. 10, pp. 44, 45). (with English translation).
"Radiant Historia, Official Complete Guide",($1^{st}$ Edition, Enterbrain, Inc., Dec. 22, 2010, pp. 6-9).
Japan Office action, dated Aug. 25, 2013 along with an english translation thereof.
Extended European Search Report (EESR) from European Patent Office (EPO) in European Patent Application No. 12185239.6, dated Jun. 17, 2015.

* cited by examiner

PLAYER CHARACTER RELATED INFORMATION (PARTY SAVE DATA)

| | CHARACTER NAME | LEVEL | HP | ... |
|---|---|---|---|---|
| PARTY INFORMATION | A | 10 | 120 | ... |
| | B | 11 | 130 | ... |
| | ⋮ | ⋮ | ⋮ | ⋮ |
| AREA CAPTURE INFORMATION | SELECTABLE AREA | CAPTURE RELATED INFORMATION | REWIND FLAG | ... |
| | AREA 1 | ACQUIRED ITEM:XXX, ⋯。 CAPTURE TIME:xx : xx | 1 | ... |
| | AREA 2 | ACQUIRED ITEM:XXX, ⋯。 CAPTURE TIME:xx : xx | 1 | ... |
| | AREA 3 | SAVE LOCATION: RELAY POINT 1 | 0 | ... |
| | AREA 4 | – | 0 | ... |
| | ⋮ | ⋮ | ⋮ | ⋮ |
| ⋮ | ⋮ | ⋮ | ⋮ | ⋮ |

Fig. 4

INITIAL AREA INFORMATION

| AREA NUMBER | AREA NAME | USAGE TIME | PROGRESS STATUS | | | ... |
|---|---|---|---|---|---|---|
| | | | EVENT NAME | CAPTURE FLAG | CAPTURE RATIO (%) | |
| 1 | AREA 1 | 0:00 | EVENT 1 | 0 | 0 | ... |
| | | | EVENT 2 | 0 | | ... |
| | | | ⋮ | ⋮ | | ⋮ |
| 2 | AREA 2 | 0:00 | EVENT 1 | 0 | 0 | ... |
| | | | EVENT 2 | 0 | | ... |
| | | | ⋮ | ⋮ | | ⋮ |
| 3 | AREA 3 | 0:00 | EVENT 1 | 0 | 0 | ... |
| | | | EVENT 2 | 0 | | ... |
| | | | ⋮ | ⋮ | | ⋮ |
| 4 | AREA 4 | 0:00 | EVENT 1 | 0 | 0 | ... |
| | | | EVENT 2 | 0 | | ... |
| | | | ⋮ | ⋮ | | ⋮ |
| ⋮ | ⋮ | ⋮ | ⋮ | ⋮ | ⋮ | ⋮ |

Fig. 5

LATEST AREA INFORMATION

| AREA NUMBER | AREA NAME | USAGE TIME | PROGRESS STATUS | | | ... |
|---|---|---|---|---|---|---|
| | | | EVENT NAME | CAPTURE FLAG | CAPTURE RATIO (%) | |
| 1 | AREA 1 | xx:xx | EVENT 1 | 1 | 100 | ... |
| | | | EVENT 2 | 1 | | ... |
| | | | ⋮ | ⋮ | | ⋮ |
| 2 | AREA 2 | xx:xx | EVENT 1 | 1 | 90 | ... |
| | | | EVENT 2 | 0 | | ... |
| | | | ⋮ | ⋮ | | ⋮ |
| 3 | AREA 3 | xx:xx | EVENT 1 | 1 | 50 | ... |
| | | | EVENT 2 | 1 | | ... |
| | | | ⋮ | ⋮ | | ⋮ |
| 4 | AREA 4 | 0:00 | EVENT 1 | 0 | 0 | ... |
| | | | EVENT 2 | 0 | | ... |
| | | | ⋮ | ⋮ | | ⋮ |
| ⋮ | ⋮ | ⋮ | ⋮ | ⋮ | ⋮ | ⋮ |

VIDEO GAME PROCESSING APPARATUS AND VIDEO GAME PROCESSING PROGRAM

CROSS-REFERENCE TO RELATED APPLICATION

The present application relates to subject matter contained in Japanese Patent Application No. 2011-207803, filed on Sep. 22, 2011, the disclosure of which is expressly incorporated herein by reference in its entirety.

BACKGROUND OF THE INVENTION

1. Field of the Invention

The present invention relates to technique for controlling progress of a video game.

2. Description of the Related Art

Heretofore, various kinds of video games including a video game called an RPG (role-playing game: a game in which a player plays a role of a character in a world of the video game, and accomplishes a predetermined object while enjoying a process that the character grows through various experiences) and a simulation game have been provided.

In video game processing apparatuses for carrying out such a video game, there are many ones in which a level of a player character is improved in accordance with progress of the video game and statuses of the player character, such as an offensive power, a health point (HP) and the like are improved.

In the video game processing apparatus in which the level of the player character is improved, there is one that adopts a specification in which a level difference between the player character and an enemy character is reflected to a method of causing enemy characters to appear (for example, Japanese Patent Application Publication No. 2007-111318).

In this manner, in game systems in each of which a concept of "level" is absorbed in an RPG, there are many ones that also absorb a concept of "time" in a virtual space. In such a game system, there is one configured so that, when the player character clears an event generated in a specific area and a story is thereby caused to proceed (that is, when the area is captured), the player cannot carry out the similar event after that. As one of the reasons to configure the game system in this manner, it is thought that, in a case where the player is allowed to carry out an event that has already been captured (or cleared) again, antinomy occurs in a story line of the video game because the story of the video game proceeds.

However, in the case of adopting such a configuration, for example, there is a problem that, an area is captured in a state that a level of the player character is low, difference in interest of the player in the video game occurs compared with the case where the area is captured in a level suitable for the area, and the interest of the player in the video game may thus be lowered depending upon timing to capture the area. Such a problem is not limited to the "level". This is a common problem in the whole setup of a character that changes in accordance with progress of the video game.

SUMMARY OF THE INVENTION

The present invention has been made in order to solve the problems described above, and it is an object of the present invention to provide a video game processing apparatus by which it is possible to prevent interest of a player in a video game system, in which a setup of a character (for example, a level and the like) is changed in accordance with progress of a video game, from being lowered and this makes it possible to improve interest of the player in the video game.

In order to achieve the above objects, the present invention is directed to a video game processing apparatus for controlling progress of a video game. The video game processing apparatus according to the present invention includes a player character related information memory for storing player character related information therein, the player character related information changing in accordance with progress of the video game.

The video game processing apparatus also includes an initial area information memory for storing initial area information therein, the initial area information indicating an initial state of each of a plurality of areas, a player character can move on the plurality of areas.

The video game processing apparatus also includes a latest area information memory for storing latest area information therein, the latest area information indicating a progress status of the video game in the same area as the area indicated by the initial area information.

The video game processing apparatus also includes a video game controller for controlling progress of the video game.

The video game processing apparatus also includes a latest area information updater for updating the latest area information corresponding to the area in accordance with progress of the video game in the area.

The video game processing apparatus also includes a usage information determiner for determining whether to use the initial area information or the latest area information in response to an operation of the player.

The video game processing apparatus also includes a player character related information updater for updating the player character related information in accordance with control content by the video game controller using the latest area information in a case where the usage information determiner determines to use the latest area information.

By configuring it as described above, it is possible to prevent interest of a player in a video game of a video game system, in which a setup of a character is changed in accordance with progress of the video game, from being lowered and this makes it possible to improve interest of the player in the video game.

In the video game processing apparatus according to the present invention, it is preferable that the video game processing apparatus further includes: an initial area information storer for storing a copy of the initial area information in a predetermined storage region in a case where the usage information determiner determines to use the initial area information; a storage information updater for updating the initial area information in accordance with progress of the video game in the area indicated by the initial area information that the initial area information storer stores in the predetermined storage region; and a selection screen display controller for causing a display device to display an area selection screen on a display screen of the display device, the area selection screen including an area corresponding to at least one of the initial area information stored in the initial area information memory, the latest area information stored in the latest area information memory and the initial area information stored in the predetermined storage region by the initial area information storer, wherein the usage information determiner determines whether to use the initial area information, the latest area information or the initial area information stored in the predetermined storage region in response to the operation of the player against the area selection screen displayed by the selection screen display controller.

In the video game processing apparatus according to the present invention, it is preferable that plural kinds of initial area information respectively indicating different areas are stored in the initial area information memory, wherein the player character related information contains a flag indicating a possibility of usage of each of the plural kinds of initial area information, and wherein the selection screen display controller causes the display device to display the area selection screen on the basis of the player character related information.

In the video game processing apparatus according to the present invention, it is preferable that the video game processing apparatus further includes a capture determiner for determining whether the area indicated by the latest area information is captured by the player character or not in accordance with a predetermined video game capture condition in a case where the latest area information updater updates the latest area information, wherein the player character related information updater updates a flag corresponding to the area of the flags so that the initial area information corresponding to the area can be used in a case where the capture determiner determines that the area indicated by the latest area information is captured.

In the video game processing apparatus according to the present invention, it is preferable that the player character related information updater updates the player character related information in accordance with the control content by the video game controller using the initial area information in a case where the usage information determiner determines to use the initial area information.

In the video game processing apparatus according to the present invention, it is preferable that the player character related information updater deletes update content of the player character related information that has been carried out since it is determined to use the initial area information, and returns the player character related information to a state before the initial area information is used, when the video game controller terminates the control using the initial area information.

Moreover, in another aspect of the present invention, the present invention is directed to a video game processing program product for causing a video game processing apparatus to control progress of a video game. The video game processing program product according to the present invention causes the video game processing apparatus to execute steps including controlling progress of the video game.

The steps also include updating latest area information corresponding to an area in accordance with progress of the video game in the area, latest area information being stored in a latest area information memory for storing latest area information, the latest area information indicating a progress status of the video game in the same area as an area indicated by initial area information, the initial area information being stored in an initial area information memory for storing the initial area information, the initial area information indicating an initial state of each of a plurality of areas, a player character can move on the plurality of areas.

The steps also include determining whether to use the initial area information or the latest area information in response to an operation of the player.

The steps also include updating player character related information stored in a player character related information memory for storing player character related information in accordance with control content by the video game controller using the latest area information in a case where it is determined to use the latest area information in the determining whether to use the initial area information or the latest area information, the player character related information changing in accordance with progress of the video game.

According to the present invention, it is possible to prevent interest of a player in a game system, in which a setup of a character is changed in accordance with progress of a video game, from being lowered, and this makes it possible to improve interest of a player in the video game.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings.

DETAILED DESCRIPTION OF THE INVENTION

Hereinafter, an example of one embodiment according to the present invention will be described with reference to the appending drawings.

Figure 1:
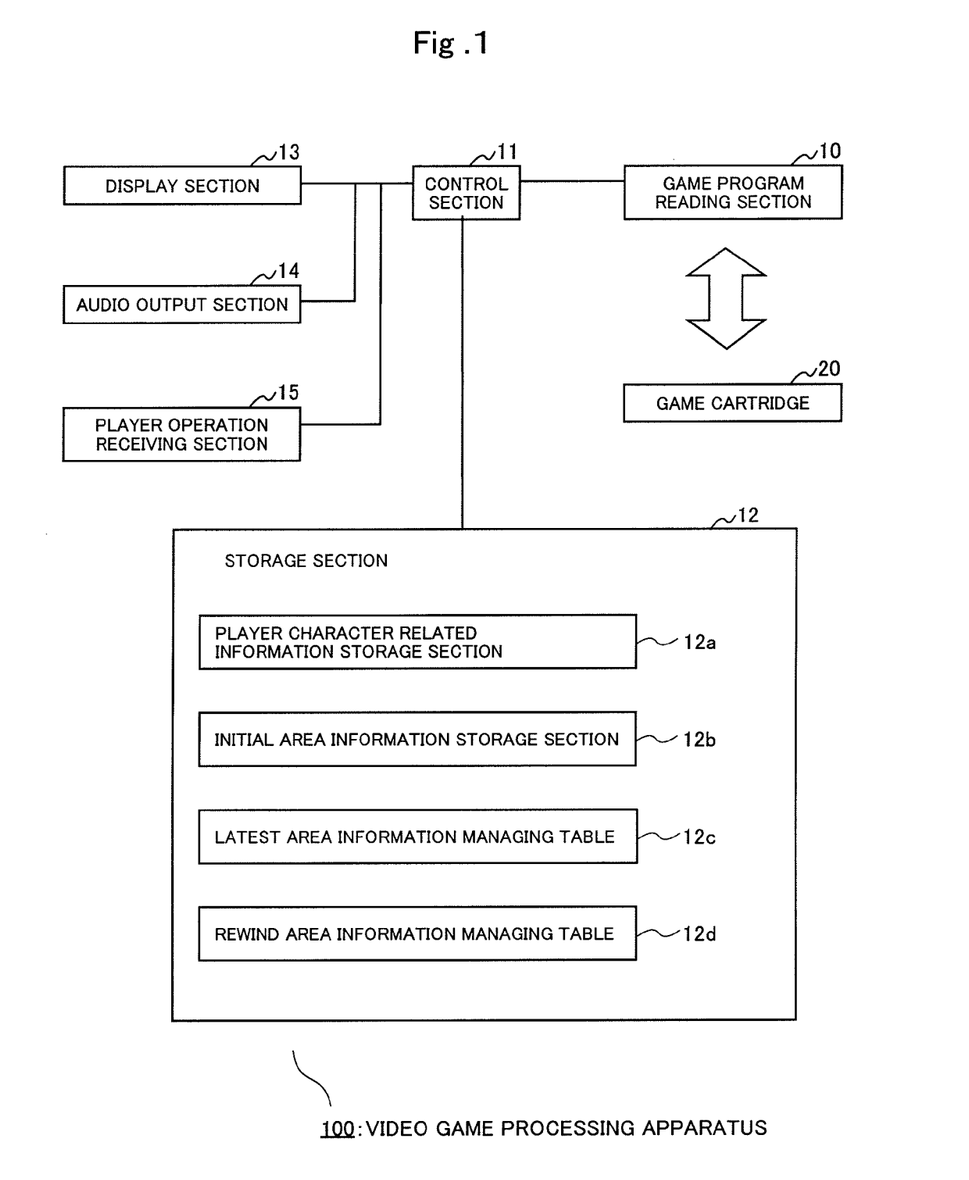
FIG. 1 is a block diagram showing an example of a configuration example of a video game processing apparatus.

FIG. 1 is a block diagram showing an example of a configuration example of a video game processing apparatus 100 according to one embodiment of the present invention. As shown in FIG. 1, the video game processing apparatus 100 includes: a game program reading section 10; a control section 11; a storage section 12; a display section 13; an audio output section 14; and a player operation receiving section 15.

The game program reading section 10 detachably receives a game cartridge 20 into which a storage medium is embedded. A video game program is stored in the storage medium. The game program reading section 10 reads out a necessary video game program from the storage medium of the inserted game cartridge 20. In this regard, in the present embodiment, a video game program classified into an RPG is stored in the storage medium embedded into the game cartridge 20. However, a category to which the video game program stored in the storage medium embedded in the game cartridge 20 belongs is not limited to an RPG. So long as a video game is one in which various kinds of information on a player character in a virtual space is changed in accordance with progress of the video game, the present invention can be applied to various kinds of categories.

Figure 2:
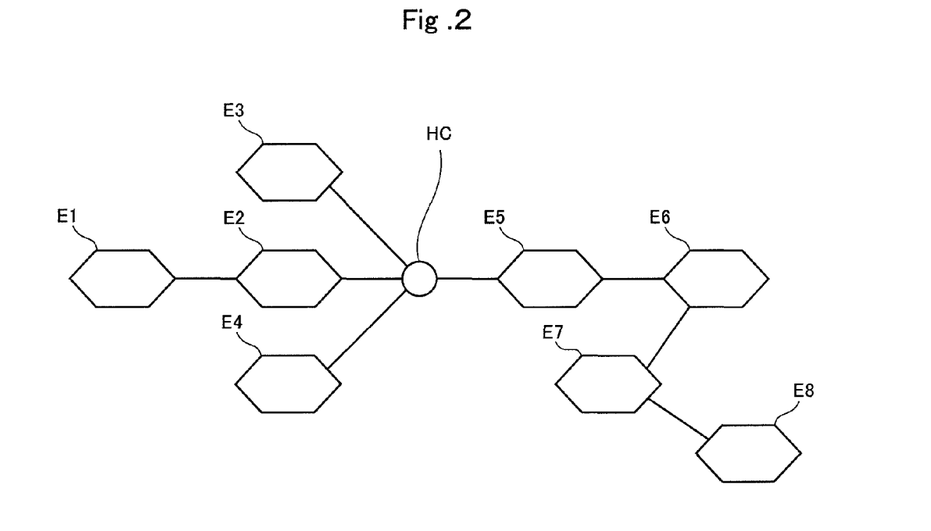
FIG. 2 is an explanatory drawing for explaining a video game whose progress is controlled by the video game processing apparatus.

FIG. 2 is an explanatory drawing for explaining a video game whose progress is controlled by the video game processing apparatus 100 in the present embodiment. In the present embodiment, a player of the video game (that is, a user of the video game processing apparatus 100) operates the player character via a controller, by which the video game is caused to proceed by satisfying clear conditions respectively set up to a plurality of areas E1 to E8 (that is, capturing the respective areas). Further, in a case where the plurality of areas are associated with each other as shown in FIG. 2, the player can capture an area E2 only by capturing an area E1. Further, when the player captures the area E2 and proceeds on to a branch point HC for a plurality of areas (hereinafter, referred to arbitrarily as a "historia crux"), the player is allowed to try to capture any of a plurality of areas E3, E4 and E5 connected to the historia crux.

Further, in the present embodiment, in the video game whose progress is controlled by the video game processing apparatus 100, the player is allowed to arbitrarily revisit an area that has been visited once by returning to the historia crux. Hereinafter, as a video game whose progress is controlled by the video game processing apparatus 100, a video game in which a player acquires an acquirable specific item in any area and a player character wears the acquired item at a movement point to other area provided at the historia crux (hereinafter, referred to as a "gate"), the gate is thereby opened to open a route toward the other area, whereby the player character can move toward the other area will be described as an example. Hereinafter, the content of the video game according to the present embodiment will be described appropriately together with the content of the video game processing apparatus 100.

The control section 11 has a function to carryout a video game program read out by the game program reading section 10 and stored in the storage section 12, and a function to carry out various kinds of controls for causing the video game to proceed in response to an operation of a player.

In particular, the control section 11 causes the video game processing apparatus 100 to carry out necessary controls for: controlling processing to control progress of the video game; latest area information updating processing to update latest area information corresponding to an area in accordance with progress of the video game in the area, latest area information being stored in the latest area information managing table 12*c* for storing the latest area information, the latest area information indicating a progress status of the video game in the same area as an area indicated by initial area information, the initial area information being stored in the initial area information storage section 12*b* for storing the initial area information, the initial area information indicating an initial state of each of a plurality of areas, a player character can move on the plurality of areas; usage information determining processing to determine whether to use the initial area information or the latest area information in response to an operation of the player; and player character related information updating processing to update the player character related information stored in the player character related information storage section 12*a* for storing the player character related information in accordance with control content by the control section 11 using the latest area information in a case where it is determined to use the latest area information in the usage information determining processing, the player character related information changing in accordance with progress of the video game. In this regard, main processing regarding the present invention will be described later in detail.

The storage section 12 is a storage medium for storing a video game program necessary when to cause a video game to proceed and various kinds of data. The storage section 12 is configured by a nonvolatile memory such as a RAM, for example. Various kinds of information registered and/or updated in accordance with progress of the video game and various kinds of information read out from the storage medium embedded in the game cartridge 20 to be used in the video game are stored in the storage section 12.

In the present embodiment, the storage section 12 includes a player character related information storage section 12*a*, an initial area information storage section 12*b*, a latest area information managing table 12*c*, and a rewind area information managing table 12*d*.

The player character related information storage section 12*a* is a storage medium for storing player character information that changes in accordance with progress of the video game. The player character information may be information that affects difficulty when the player operates the player character to capture various kinds of events (in the present embodiment, a plurality of areas E1 to E8) in the video game.

Figure 3:
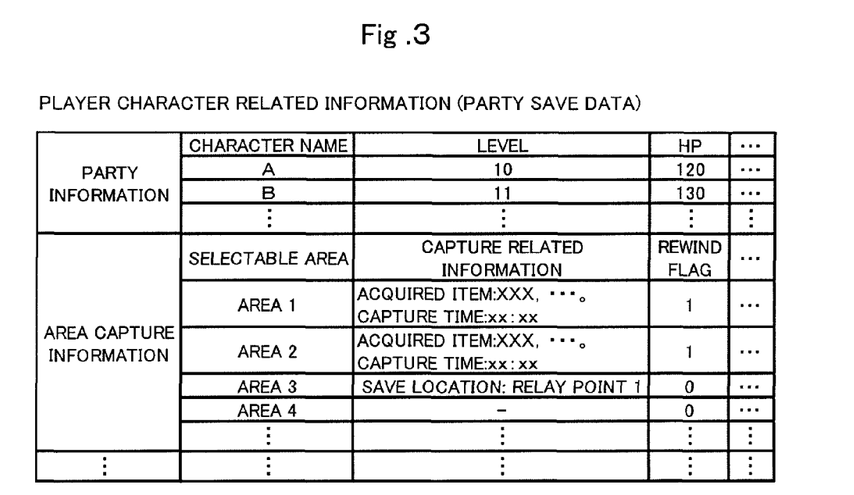
FIG. 3 is an explanatory drawing showing an example of a storage state of player character related information.

FIG. 3 is an explanatory drawing showing an example of a storage state of the player character related information (or party save data) stored in the player character related information storage section 12*a*. As shown in FIG. 3, the player character related information contains party information and area capture information. The party information is information on a group of player characters that the player can operate (hereinafter, referred to as a "party"). The area capture information is information on progress of the video game (that is, capture of the plurality of areas E1 to E8).

Here, the party information contains: a character name for each of the player characters constituting the party; a level of each player character and a health point (HP) of each player character. In this regard, the party information may indicate information on an individual player character.

Further, the area capture information contain: an area that the player can select (that is, in the video game, an area for which a route is opened by opening a gate at the historia crux, further, for the player, an area that the player can try to capture by operating the party); capture related information; and a rewindable flag.

Here, the "capture related information" is information indicating progress of capture for each area, a capture result and the like. In the present embodiment, as shown in FIG. 3, an acquired item (for example, an item that the party acquired as capture result and the like, in the present embodiment, including a specific item to be worn to the gate), a capture time (for example, an actual time that the player takes to capture an area, or the like), a save location (for example, a location into which the player saves data in the process of area capture) are contained as the capture related information.

Further, the "rewind flag" is a flag indicating whether the player is allowed to try to capture (or play) the area that has already been captured again. "1" is set up to the rewind flag in a case where the player is allowed to try to capture the area again. On the other hand, "0" is set up to the rewind flag in a case where the player is not allowed to try to capture the area again. As a condition to try to capture the area again (hereinafter, referred to as a "try-again condition"), one included in latest area information (will be described later) and corresponding to a "capture rate" is set up in advance. Namely, for example, in the present embodiment, when a "capture rate" of "Area 1" is "100%", the corresponding rewind flag becomes "1". Further, when a "capture rate" of "Area 2" is "90% or more", the corresponding rewind flag becomes "1" (see FIGS. 3 and 5). Hereinafter, in the present embodiment, the word "capture an area" means that the rewind flag for the area is set to "1". However, a configuration of the player character related information is not limited to this. For example, the video game processing apparatus 100 may be configured so that the player character can always pass through the gate that has been opened once. Further, the video game processing apparatus 100 may be configured so that a rewind flag of an area for which a route is opened is always "1" in spite of a capture rate of the area.

The initial area information storage section 12b is a storage medium for storing initial area information indicating an initial state of each of the plurality of areas where the player character can move or operate. The initial area information indicates an initial state of each area (that is, a state before changing in accordance with progress of the video game). In this regard, the video game processing apparatus 100 may be configured so that the information for carrying out the video game in the initial area (for example, image information, non-player character information and the like) is stored in the initial area information storage section 12b, or may be configured so that the control section 11 acquires it via the game program reading section 10 if necessary.

Figure 4:
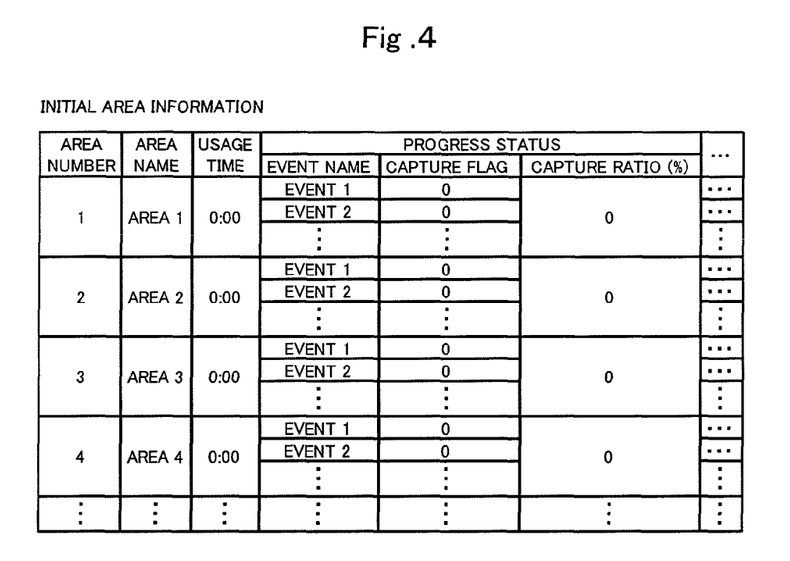
FIG. 4 is an explanatory drawing showing an example of a storage state of initial area information.

FIG. 4 is an explanatory drawing showing an example of a storage state of the initial area information stored in the initial area information storage section 12b. As shown in FIG. 4, the initial area information contains: an area number by which an area can be identified uniquely; an area name; a time (usage time) used to capture the area; and a progress status.

Here, the "progress status" indicates a progress status of the video game in the area. In the present embodiment, the "progress status" contains: an event name indicating an event set up for each area; a capture flag indicating whether each event has been captured or not; and a capture rate calculated in accordance with the number of capture of events (or the number of captured events). In this regard, various kinds of content, such as "acquisition of an item", "battle against a specific enemy character, and winning against the enemy character", and the like, are thought as an example of the "event".

The latest area information managing table 12c is a storage medium for storing latest area information indicating a progress status of the video game in the same area as the area indicated by the initial area information. Namely, in a case where a status of an area is changed in response to an operation of the player (for example, in a case where one of events in a certain area is captured), the control section 11 in principle updates the latest area information stored in the latest area information managing table 12c.

Figure 5:
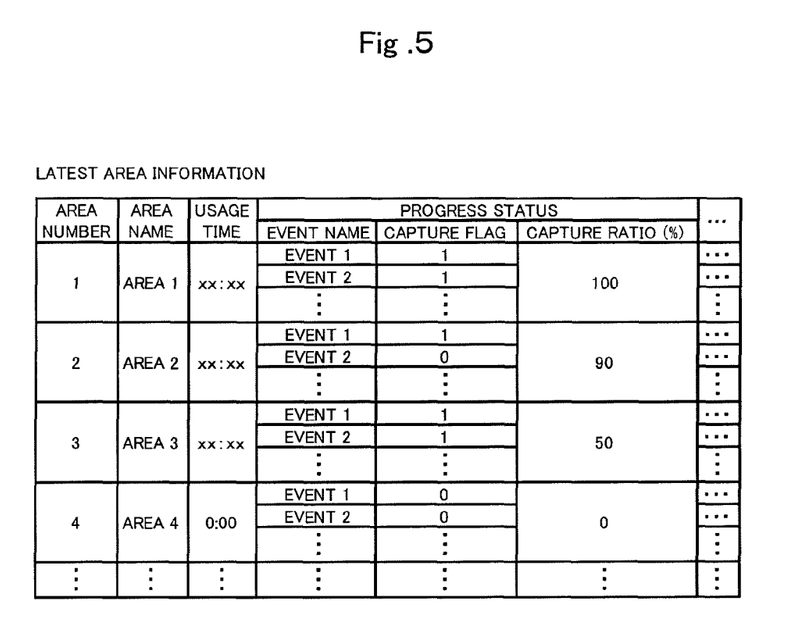
FIG. 5 is an explanatory drawing showing an example of a storage state of latest area information.

FIG. 5 is an explanatory drawing showing an example of a storage state of the latest area information stored in the latest area information managing table 12c. As shown in FIG. 5, the latest area information contains the items included in the initial area information (see FIG. 4). However, the latest area information managing table 12c is appropriately updated in accordance with progress of the video game unlike the initial area information stored in the initial area information storage section 12a.

The rewind area information managing table 12d is a storage medium that becomes a destination to save of a copy (including apart of copy, hereinafter, referred to arbitrarily as "rewind area information") of the initial area information in a case where it is determined to use the initial area information in video game processing (will be described later, see FIG. 6). Namely, in the present embodiment, the control section 11 does not update the initial area information stored in the initial area information storage section 12b itself; copies the initial area information if necessary; and updates the copied information, by which the control section 11 causes the player to experience capture or challenge of an area again (that is, carries out the video game in the area in such a state that time base is "rewound", in other words, carries outplaying of the area again).

By configuring the video game processing apparatus 100 so as to include the initial area information storage section 12b and the rewind area information managing table 12d, the initial area information that has never been updated is always stored in the initial area information storage section 12d, and the rewind area information is updated in the rewind area information managing table 12d. Thus, in a case where the player plays the area again, only the rewind area information managing table 12d is updated. Therefore, for example, in a case where the player hopes to try plural kinds of methods of capturing one area, it is possible to meet the player's hope only by registering a plurality of the same initial area information in the rewind area information managing table 12d. In this regard, the video game processing apparatus 100 may be configured so that either the initial area information storage section 12b or the rewind area information managing table 12d is included in the storage section 12 in a case where the rewind area information is always reset when to terminate playing the area again. In this case, there is a need to provide, in the storage section 12, a storage medium for storing information for resetting the updated initial area information in an update impossible state.

The display section 13 is a display device for displaying the game screen according to progress of the video game and an operation of the player in accordance with a control of the control section 11. The display section 13 is constructed by a liquid crystal display, for example.

The audio output section 14 outputs audio in response to progress of the video game and an operation of the player in accordance with a control of the control section 11.

The player operation receiving section 15 receives an operational signal according to an operation of the player from a controller constructed by a plurality of buttons, a mouse and the like, and notifies that result to the control section 11.

Next, an operation of the video game processing apparatus 100 according to the present embodiment will be described.

Figure 6:
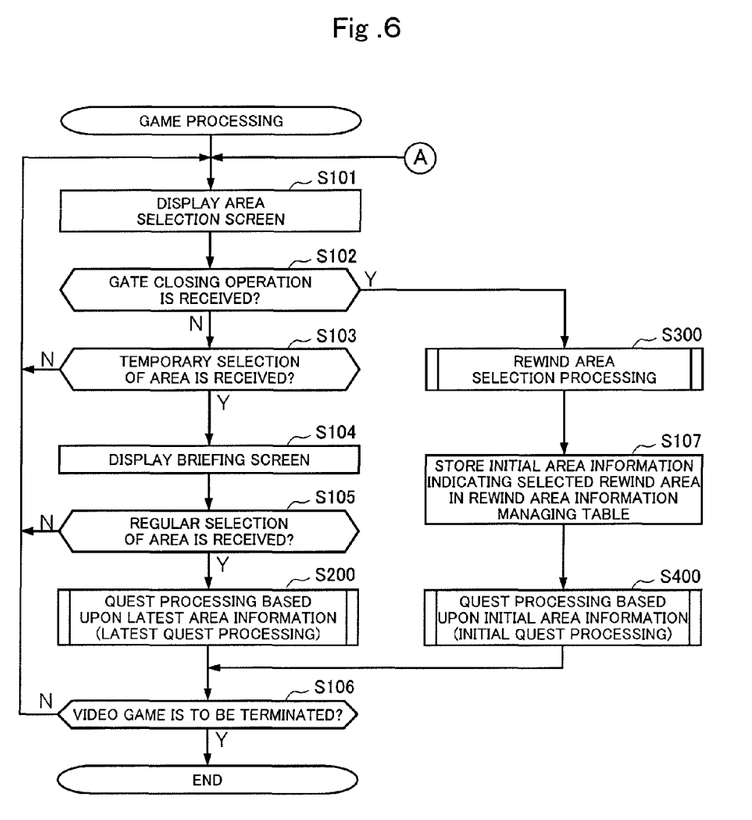
FIG. 6 is a flowchart showing an example of game processing.

FIG. 6 is a flowchart showing an example of video game processing carried out by the video game processing apparatus 100. In the video game processing, processing to carry out progress of the video game using the latest area information and progress of the video game using the initial area information is carried out in response to an operation of the player. In this regard, the content of processing with no relationship to the present invention may be omitted.

The video game processing is started when the video game processing apparatus 100 starts up, for example.

When the video game processing is started, the control section 11 causes the display section 13 to display an area selection screen on the display screen of the display section 13 in accordance with a video game program read out by the game program reading section 10 (Step S101).

Figure 7:
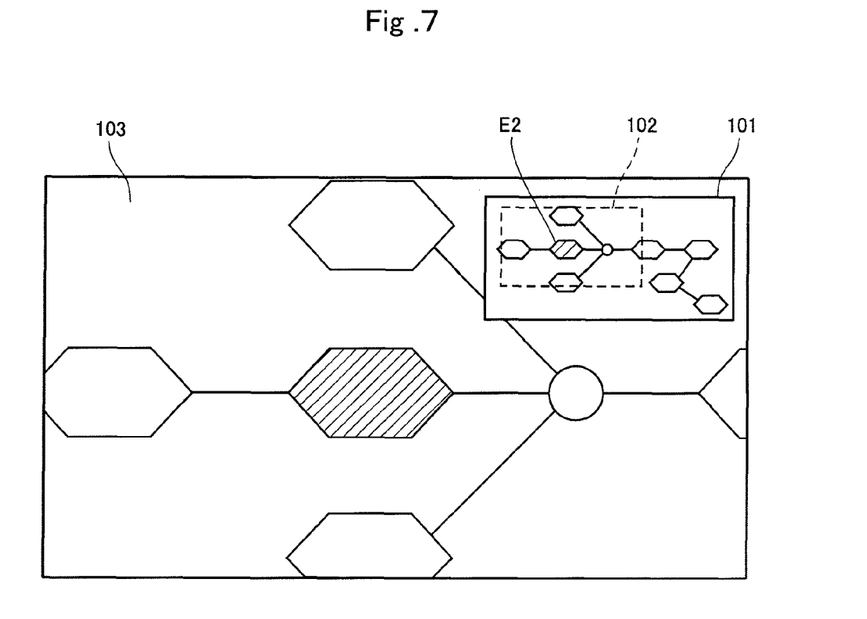
FIG. 7 is an explanatory drawing showing an example of area selection screen.

FIG. 7 is an explanatory drawing showing an example of the area selection screen. As shown in FIG. 7, in the area selection screen, an area selection image display region 101 for displaying an image indicating a relationship between the plurality of areas E1 to E8 and the historia crux HC shown in FIG. 2 (hereinafter, referred to as an "area selection image"); a region (hereinafter, referred to as an "enlarged display region") 102 with a predetermined range in which the area E2, which is determined to be one temporarily selected in an area selection region in response to an operation of the player is centered; and an enlarged image display region 103 in which the image within the enlarge display region 102 is enlargedly displayed are provided. In this regard, in a case where the area is not temporarily selected, an image in which the whole image is enlarged to the extent that the whole area selection is fitted into the display screen is displayed in the enlarged image display region 103.

Here, the control section 11 refers to the player character related information, and causes the display section 13 to identifiably display the area that is register as a selectable area. In this regard, the video game processing apparatus 100 may be configured so that the control section 11 causes the display section 13 to display only the selectable area. Further, the video game processing apparatus 100 may be configured so that the control section 11 causes the display section 13 to unselectably display the area that has already been captured.

When the area selection screen is displayed, the control section 11 determines whether a predetermined "gate closing operation" is received or not (Step S102). Here, the "gate closing operation" means an operation set up as one that is carried out when the player hopes "initial quest processing". For example, an operation to press a predetermined button of buttons constituting the player operation receiving section 15 for a long time is assigned as the "gate closing operation".

In a case where it is determined that the "gate closing operation" is not received ("No" at Step S102), the control section 11 determines whether temporary selection of an area is received or not (Step S103). Here, in a case where it is determined that the temporary selection of the area is not received ("No" at Step S103), the control section 11 causes the processing flow to shift to the process at Step S101. In this regard, in a case where a predetermined selection canceling operation is received in a state in which temporary selection of an area is received (for example, as shown in FIG. 7, a state in which temporary selection of the area E2 is received), the control section 11 cancels the temporarily selected state of the area, and causes the processing flow to shift to the process at Step S101.

On the other hand, in a case where it is determined that the temporary selection of the area is received ("Yes" at Step S103), the control section 11 causes the display section 13 to display a briefing screen on the display screen of the display section 13 (Step S104). Here, the "briefing screen" is a screen intended to provide various kinds of information on the temporarily selected area to the player. Hereinafter, the case where temporary selection of the area E2 is received will be described as an example.

Figure 8:
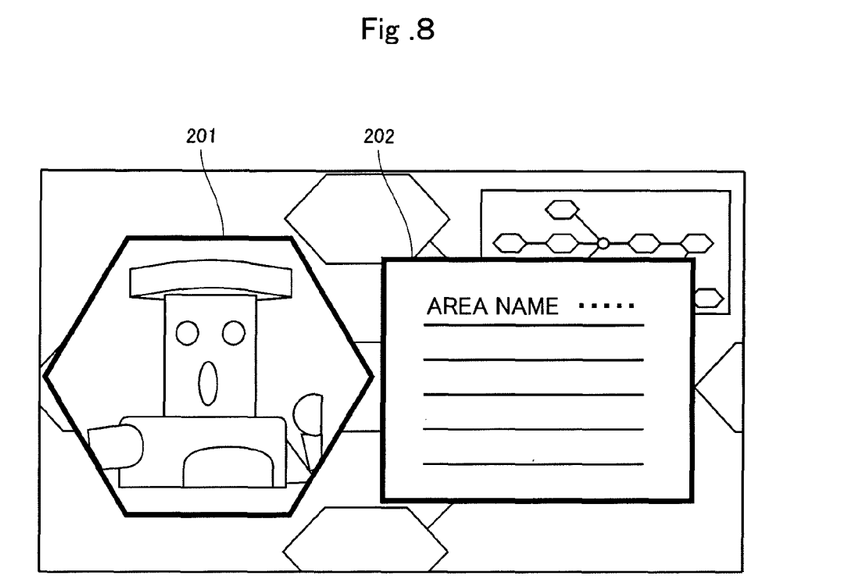
FIG. 8 is an explanatory drawing showing an example of briefing screen.

FIG. 8 is an explanatory drawing showing an example of a briefing screen. As shown in FIG. 8, an area image display region 201 in which an image corresponding to the area E2 that is in the temporarily selected state is displayed; and a text display region 202 in which an explanation text regarding the area E2 that is in the temporarily selected state is displayed are provided on the briefing screen.

Here, display of the briefing screen combines with a confirmation phase for the player. Further, the video game processing apparatus 100 may be configured so that a capture movie according to the number of ensured fragments in an area (for example, the number of captured events and the like) and the number of opened gates (for example, the number of captured areas and the like) is displayed in the area image display region 201. Further, display of a briefing image combines with a step of promoting reading (or prediction) of background data and the like.

When the briefing screen is displayed, the control section 11 determines whether regular selection of the area is received or not (Step S105). Here, for example, in a case where it is determined that the regular selection of the area E2 has not been received yet because of elapse of a predetermined time ("No" at Step S105), the control section 11 eliminates the briefing screen, and causes the processing flow to shift to the process at Step S101.

On the other hand, in a case where it is determined that the regular selection of the area E2 is received ("Yes" at Step S105) by receiving a selection operation against the area image display region 201 on the briefing screen, for example, the control section 11 refers to the latest area information managing table 12c, and carries out quest processing (that is, a process to carry out an event in the area, hereinafter, quest processing using the latest area information is referred to as "latest quest processing") based upon the latest area information corresponding to the area E2 (Step S200).

In the present embodiment, the control section 11 carries out processing to control progress of the video game using the latest area information as the latest quest processing.

Figure 9:
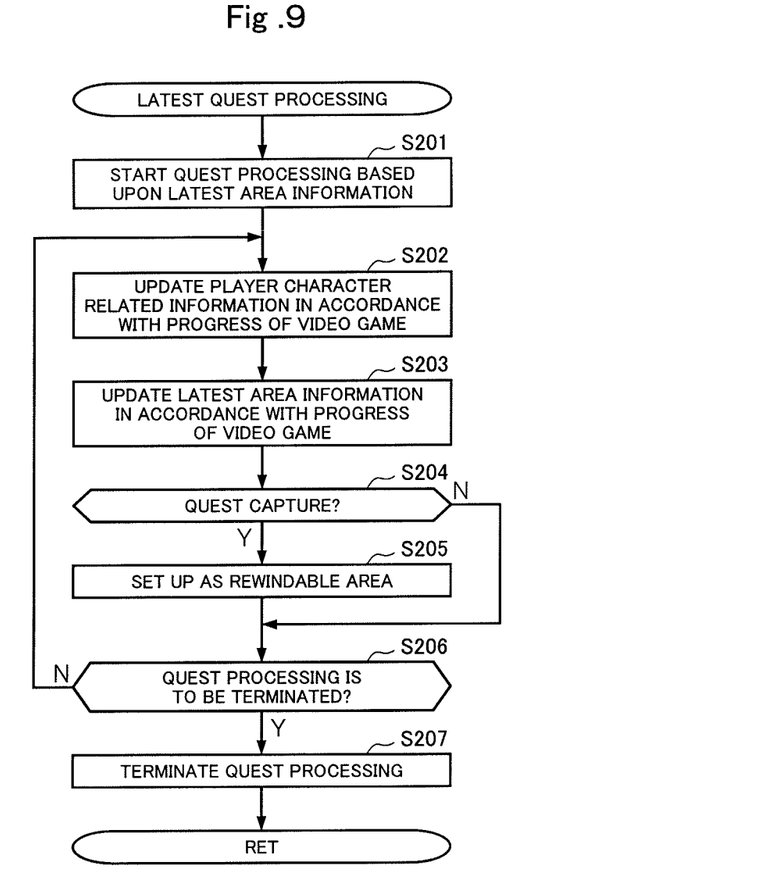
FIG. 9 is a flowchart showing an example of latest quest processing.

FIG. 9 is a flowchart showing an example of the latest quest processing carried out by the video game processing apparatus 100. In the latest quest processing, the control section 11 first starts quest processing based upon the latest area information corresponding to the area for which the selection is received in the video game processing (Step S201). In this regard, in the present embodiment, the control section 11 causes the player character to operate in the area indicated by the latest area information on the basis of the player character related information.

When the quest processing is started, the control section updates the player character related information in accordance with progress of the video game (Step S202). More specifically, for example, in a case where the player character defeats an enemy character, the control section 11 applies an experience point according to the defeated enemy character to the player character (or party). In a case where the applied experience point reaches a predetermined value, the control section 11 improves the level of the player character.

When the player character related information is updated in accordance with progress of the video game, the control section 11 updates the latest area information in accordance with the progress of the video game (Step S203). More specifically, when the player captures an event in the area, for example, the control section 11 sets up "1" to a capture flag corresponding to the captured event in the latest area information, and updates the capture rate. In this regard, in the present embodiment, when the control section 11 receives a movement operation toward other area, which is inputted by the player via the player operation receiving section 15, during execution of the latest quest processing, the control section 11 starts the latest quest processing with respect to the area according to the movement operation.

When the latest area information is updated, the control section 11 determines whether the area is captured or not on the basis of the updated latest area information (Step S204). Here, in a case where it is determined that the area is not captured ("No" at Step S204) because the latest area information after update does not meet a predetermined area capture condition, the control section 11 causes the processing flow to shift to a process at Step S206 (will be described later).

On the other hand, in a case where it is determined that the area is captured ("Yes" at Step S204) because the latest area information after update satisfies the predetermined area capture condition, the control section 11 sets up the area that is determined to be captured as a rewindable area (Step S205). More specifically, the control section 11 sets up "1" to the rewind flag corresponding to the area indicated by the updated latest area information in the player character related information.

The control section 11 then determines whether the quest processing is to be terminated or not in accordance with the quest termination condition according to the area (Step S206). Here, in a case where it is determined that the quest processing is not to be terminated ("No" at Step S206), the control section 11 continues the quest processing based upon the latest area information (and the player character related information), and causes the processing flow to shift to a process at Step S202.

On the other hand, in a case where it is determined that the quest processing is to be terminated ("Yes" at Step S206), for example, in accordance with the fact that the capture rate in the latest area information becomes "100%" or the like, the control section 11 terminates the latest quest processing (Step S207), and causes the processing flow to shift to the process at Step S106 in the video game processing (see FIG. 6). In this regard, when the quest processing is terminated, the control section 11 carries out quest termination rendering associated with the capture rate in advance.

When the latest quest processing is terminated, the control section 11 determines whether the video game is to be terminated or not in accordance with a predetermined video game termination condition (Step S106). Here, in a case where it is determined that the video game is not to be terminated ("No" at Step S106), the control section 11 causes the processing flow to shift to the process at Step S101.

On the other hand, in a case where it is determined that the video game is to be terminated ("Yes" at Step S106), the control section 11 terminates the processing herein.

On the other hand, in the process at Step S102 in the video game processing, in a case where it is determined that the "gate closing operation" is received ("No" at Step S102), the control section 11 carries out rewind area selection processing (Step S300).

Figure 10:
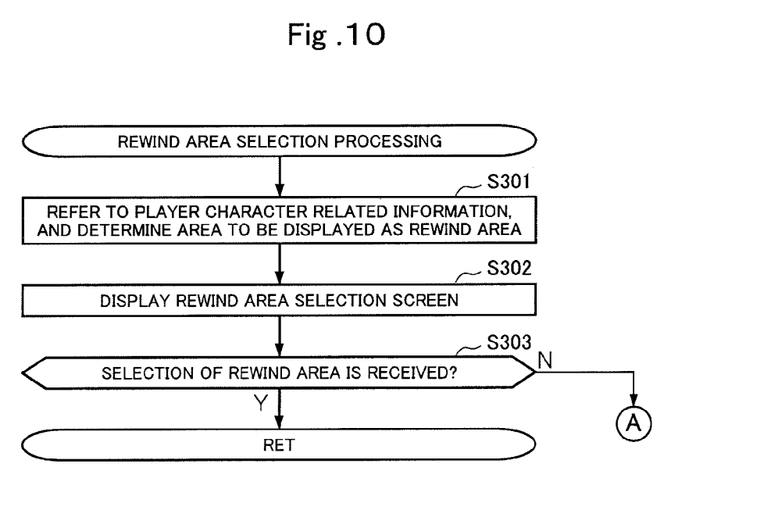
FIG. 10 is a flowchart showing an example of rewind area selection processing.

In the present embodiment, the control section 11 carries out a process to receive selection of a rewind area from the player as the rewind area selection processing.

FIG. 10 is a flowchart showing an example of the rewind area selection processing carried out by the video game processing apparatus 100. In the rewind area selection processing, the control section 11 first refers to the player character related information, and determines an area to be displayed as a rewind area (Step S301). In the present embodiment, the control section 11 determines that the area to which "1" is set up as the rewind flag in the player character related information is the area to be displayed as the rewind area (that is, determines the rewind area).

When the rewind area is determined, the control section 11 causes the display section 13 to display a rewind area selection screen for selectably display the rewind area on the display screen of the display section 13 (Step S302).

Figure 11:
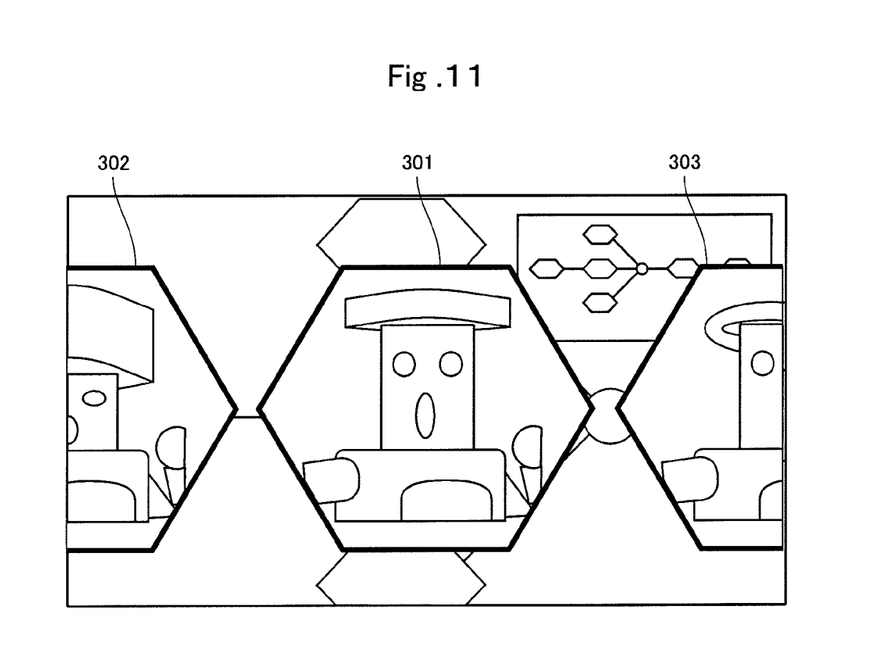
FIG. 11 is an explanatory drawing showing an example of a rewind area selection screen.

FIG. 11 is an explanatory drawing showing an example of the rewind area selection screen. In a case where there are a plurality of rewind areas, rewind area image display regions 301, 302, 303 are provided on the rewind area selection screen as shown in FIG. 11. Images corresponding to the plurality of rewind areas are displayed in the rewind area image display regions 301, 302, 303, respectively.

When the rewind area selection screen is displayed, the control section 11 determines whether selection of the rewind area is received or not (Step S303). Here, in a case where it is determined that the selection of the rewind area has not been received yet ("No" at Step S303) in accordance with the fact that a request to display the area selection screen is receive, for example, the control section 11 eliminates the rewind area selection screen, and causes the processing flow to shift to the process at Step S101 in the video game processing (see FIG. 6).

On the other hand, in a case where it is determined that selection of the area E2 displayed as the rewind area is received ("Yes" at Step S303) in accordance with the fact that a predetermined operation by the player is received in a state that an image corresponding to the area E2 is displayed in the rewind area image display region 301 positioned at the center of the screen, the control section 11 causes the processing flow to shift to the process at Step S107 in the video game processing (see FIG. 6).

When the selection of the rewind area is received in the rewind area selection processing, the control section 11 stores the initial area information indicating the selected rewind area in the rewind area information managing table (Step S107). In the present embodiment, the control section 11 stores the initial area information on the area E2 in the rewind information managing table 12d.

When the initial area information is stored in the rewind area information managing table 12d, the control section 11 carries out quest processing (hereinafter, the quest processing using the stored initial area information is referred to as "initial quest processing" or "rewind quest processing") based upon the initial area information stored in the rewind area information managing table 12d (hereinafter, referred to arbitrarily as "rewind area information") (Step S400).

Figure 12:
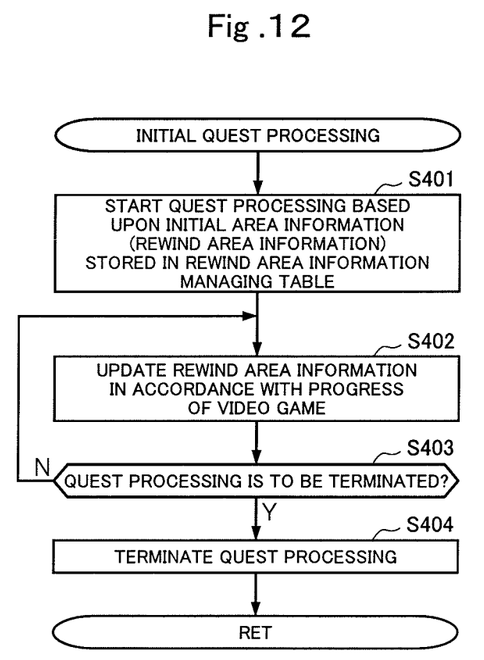
FIG. 12 is a flowchart showing an example of initial quest processing.

In the present embodiment, the control section 11 carries out, as the initial quest processing, a process to control progress of the video game by using the initial area information.

FIG. 12 is a flowchart showing an example of the initial quest processing carried out by the video game processing apparatus 100. In the initial quest processing, the control section 11 first starts quest processing based upon the initial area information stored in the rewind area information managing table 12d in the video game processing (Step S401). In this regard, in the present embodiment, the control section 11 causes the player character to move in the area indicated by the initial area information on the basis of the player character related information. Namely, even though the time is rewound in the video game, items owned by the player character and the like are not reduced, and parameters such as a level, the maximum HP and the like are maintained. By configuring the video game processing apparatus 100 in this manner, it becomes possible to provide an impression and a play feeling of the area, which are different from the past, to the player. Further, the video game processing apparatus 100 may be configured so that the player can view another branch scenario by challenging capture of an area at a higher level than that when the player has captured the area for the first time, for example.

In this regard, the video game processing apparatus 100 may be configured so that, in the quest processing based upon the initial area information, the control section 11 does not update information defined as one that influences a main story of the video game, such as a level of the player character and the like, in advance unlike the case where progress of the video game is controlled using the latest area information. By configuring the video game processing apparatus 100 so that the player character related information is not updated when to use the rewind data, it becomes possible to prevent a quality of the video game from being lowered due to play of the area again, or the like.

When the quest processing is started, the control section 11 updates the rewind area information in accordance with progress of the video game (Step S402).

When the rewind area information is updated, the control section 11 determines whether the quest processing is to be terminated or not on the basis of the updated rewind area information in accordance with the quest termination condition according to the area (Step S403). Here, in a case where it is determined that the quest processing is not to be terminated ("No" at Step S403), the control section 11 continues the quest processing based upon the rewind area information (and the player character related information), and causes the processing flow to shift to the process at Step S402.

On the other hand, in a case where it is determined that the quest processing is to be terminated ("Yes" at Step S403), for example, in accordance with the fact that the capture rate in the initial area information becomes "100%" or the like, the control section 11 terminates the initial quest processing (Step S404), and causes the processing flow to shift to the process at Step S106 in the video game processing (see FIG. 6). In this regard, when the quest processing is to be terminated, the control section 11 carries out quest termination rendering associated with the capture rate in advance. Further, the video game processing apparatus 100 may be configured so that the control section 11 resets the rewind area information at this time.

In this regard, when a movement operation toward other area, which is inputted by the player via the player operation receiving section 15, is received during execution of the initial quest processing, the control section 11 starts the initial quest processing for the area according to the movement operation. Namely, in the present embodiment, in a case where the video game is started from rewind data of any area (stage), the control section 11 updates not only the rewind data of a start area but also the rewind data of a destination area when the player character moves from the area in which the video game is started (start area) to other area (in the present embodiment, the control section 11 updates the rewind area information managing table 12d). Therefore, in the video game provided by the video game processing apparatus 100 according to the present embodiment, once the player carries out "rewind", the player is allowed to play the video game from an initial state (that is, state allowed to be returned by the "rewind") except for the experience point or the like of the player character until the "rewind" is cancelled. Conversely, the player cannot update the latest data of other area in a case where area capture is started fro the latest data.

As explained above, in the embodiment described above, the video game processing apparatus 100 for controlling progress of a video game is configured so as to include: the player character related information storage section 12a for storing the player character related information therein, the player character related information changing in accordance with progress of the video game; the initial area information storage section 12b for storing the initial area information therein, the initial area information indicating an initial state of each of the plurality of areas, the player character can move on the plurality of areas; and the latest area information managing table 12c for storing the latest area information therein, the latest area information indicating a progress status of the video game in the same area as the area indicated by the initial area information; and so as to: control the progress of the video game; update the latest area information corresponding to the area (for example, the latest area information corresponding to the area E2) in accordance with the progress of the video game in the area (for example, the area E2); determine whether to use the initial area information or the latest area information in response to an operation of the player (for example, determine whether the gate closing operation is received or not); and update the player character related information in accordance with the control content by the control section 11 using the latest area information in a case where it is determined to use the latest area information. Therefore, it is possible to prevent interest of the player in the game system, in which a setup of a character is changed in accordance with progress of the video game, from being lowered, and this makes it possible to improve interest of the player in the video game.

Namely, by storing the latest area information and the initial area information separately, it becomes possible to effectively realize a probability to capture again (or replay) the area, which has already been captured once, at the level of the player character different from that when to capture the area for the first time (that is, using the updated player character related information).

Further, in the embodiment described above, the video game processing apparatus 100 is configured so as to: store a copy of the initial area information in a predetermined storage region (for example, store the initial area information indicating the selected rewind area in the rewind area information managing table 12d in the video game processing) in a case where it is determined to use the initial area information (for example, in a case where it is determined in the video game processing that the gate closing operation is received); update the initial area information (for example, which is not the initial area information stored in the initial area information storage section 12d, but the initial area information stored in the rewind area information managing table 12d, that is, the copied initial area information) in accordance with progress of the video game in the area indicated by the initial area information that the initial area information storer stores in the predetermined storage region; cause the display device (for example, the display section 13) to display the area selection screen on the display screen of the display device, the area selection screen (for example, the area selection screen or the rewind area selection screen, see FIGS. 6 and 10) including the area corresponding to at least one of the initial area information stored in the initial area information storage section 12b, the latest area information stored in the latest area information managing table 12c and the initial area information stored in the predetermined storage region (for example, the rewind area information managing table 12d); and determine whether to use the initial area information, the latest area information or the initial area information (for example, the rewind area information) stored in the predetermined storage region in response to the operation of the player against the area selection screen displayed by the selection screen display controller. Therefore, it is possible to carryout control using the latest area information, for example, in a case where the player hopes to cause the main story of the video game to proceed. On the other hand, it is also possible to carry out control using the initial area information independent of the latest area information in a case where the player hopes to capture the area, which has already been captured once, again in the state that the level or the like of the player character is changed from the past. For this reason, it becomes possible to replay the area that has already been captured once, and this makes it possible to improve interest of the player in the video game. Further, since the original data of the initial area information has not been updated, it becomes possible to readily provide replay of an area to the player.

In this regard, although it has not been mentioned particularly in the embodiment described above, the video game processing apparatus 100 may be configured so that the predetermined storage region in which the initial area information is stored is constructed by a cache memory. This makes it possible to prevent the amount of information of the copied initial area information, which is information independent of the information on the main story of the video game (the latest area information and the like), from becoming excessive. In this regard, in order to prevent the amount of information of the copied initial area information from becoming excessive, the video game processing apparatus 100 may be configured so as to delete part or all of the copied initial area information in accordance with a deletion condition of the copied initial area information, for example.

Further, in the embodiment described above, the video game processing apparatus 100 is configured so that: plural kinds of initial area information respectively indicating different areas are stored in the initial area information storage section 12*b* (for example, see FIG. 4); the player character related information contains a flag (for example, the rewind flag, see FIG. 3) indicating a possibility of usage of each of the plural kinds of initial area information, and the video game processing apparatus 100 causes the display device to display the area selection screen on the basis of the player character related information. Therefore, it becomes possible to adjust the amount of areas allowed to be selected and the like on the basis of the player character related information according to progress of the video game, and this makes it possible to give variety to the areas to be selectably displayed.

Further, in the embodiment described above, the video game processing apparatus 100 is configured so as to: determine whether the area indicated by the updated latest area information is captured by the player character or not in accordance with a predetermined video game capture condition in a case where the latest area information is updated; and update the flag corresponding to the captured area of the flags contained in the player character related information so that the initial area information corresponding to the area can be used in a case where it is determined that the area indicated by the latest area information is captured (for example, set up "1" to the rewind flag). Therefore, it becomes possible to increase the area that the player can replay in accordance with progress of the video game.

In this regard, in the embodiment described above, it has been described, as an example, the case where the video game processing apparatus 100 does not update the information defined as one that influences the main story of the video game in advance, such as update of the level of the player character and the like, in a case where progress of the video game is controlled using the initial area information. However, the video game processing apparatus 100 may be configured so as to update the player character related information in accordance with the control content using the initial area information (that is, in accordance with progress of the video game) in a case where it is determined to use the initial area information. By configuring the video game processing apparatus 100 so as to update the player character related information when rewind data (for example, the rewind information that is updatable initial area information) are used, it becomes possible to provide the video game by which it is readily possible to efficiently raise an experience point (level) of the player character in an area at which the player is good, or it is readily possible to play another branch event (branch stage) constructed in the area alternatively.

Further, in a case where the player character related information is updated when to use the rewind data, the video game processing apparatus 100 may be configured so as to deletes update content of the player character related information that has been carried out since it is determined to use the initial area information when the control using the initial area information is terminated (that is, return the player character related information to the state before the initial area information is used). Further, the video game processing apparatus 100 may be configured so as to maintain part of the update content of the player character related information that has been carried out since it is determined to use the initial area information even after the control using the initial area information is terminated, for example.

In this regard, in the embodiment described above, the video game processing apparatus 100 is configured so as to carry out various kinds of processing such as the video game processing described above on the basis of the video game program read out from the game cartridge 20. However, the video game processing apparatus 100 may be configured to acquire the video game program via a communication network such as the Internet. Further, the video game processing apparatus 100 may be configured to function as a video game server to provide the video game program to a video game terminal via the communication network.

Further, in the embodiment described above, the video game processing apparatus 100 carries out the various kinds of processes described above in accordance with various kind of control programs (for example, the video game processing program) stored in a storage device (the storage section 12) with which the video game processing apparatus 100 itself is provided.

INDUSTRIAL APPLICABILITY

The present invention is useful to provide a video game processing apparatus (or to carry out controls of a video game) by which it is possible to prevent interest of a player in a video game system, in which a setup of a character is changed in accordance with progress of a video game, from being lowered and this makes it possible to improve interest of the player in the video game.

What is claimed is:

1. A video game processing apparatus controlling progress of a video game, comprising:

a memory storing:
  player character related information, the player character related information changing in accordance with progress of the video game;
  initial area information, the initial area information indicating an initial state of each of a plurality of areas, wherein a player character can move on the plurality of areas; and
  latest area information, the latest area information indicating a progress status of the video game in each of the plurality of areas indicated by the initial area information; and
a controller controlling the progress of the video game, the progress of the game including:
  updating the latest area information of the plurality of areas in accordance with the progress of the video game;
  displaying, as an area selection screen, each of the plurality of areas on a display, the display graphically indicating a relationship between the plurality of areas, at least one gate connecting a first group of the plurality of areas with a second group of the plurality of areas, the second group of the plurality of areas being selectable by an operation of a player when the player character progresses to the gate, the first group of the plurality of areas being revisitable by the operation of the player when the player character progresses to the gate;
  determining whether to use the initial area information or the latest area information corresponding to a selected area in response to the operation of the player character, the initial area information being usable when the player character progresses to the gate and the selected area is in the first group of the plurality of areas;
  progressing the game in the selected area using a corresponding one of the initial area information and the latest area information in response to a determination result of the determining, the selected area being progressed using current player character related information stored in the memory; and
  updating the player character related information in the memory in accordance with the progressing of the game in the selected area only when the determination result is to use the latest area information.

2. The video game processing apparatus according to claim 1, wherein
the memory stores a copy of the initial area information in a predetermined storage region when the controller determines to use the initial area information; and
the controller updates the initial area information in accordance with the progress of the video game in the selected area indicated by the initial area information stored in the predetermined storage region.

3. The video game processing apparatus according to claim 2, wherein a plurality of different initial area information respectively indicates different areas being stored in the initial area information memory,
wherein the player character related information contains a flag indicating a possibility of usage of each of the plurality of different initial area information, and
wherein the controller displays the area selection screen based on the player character related information.

4. The video game processing apparatus according to claim 3,
wherein the controller determines whether the selected area indicated by the latest area information is captured by the player character in accordance with a predetermined video game capture condition when the latest area information is updated,
wherein the controller updates a flag corresponding to the selected area of the flags so that the initial area information corresponding to the selected area can be used when the controller determines that the selected area indicated by the latest area information is captured.

5. The video game processing apparatus according to claim 1, wherein controller updates the player character related information in accordance with the control content using the initial area information when the controller determines to use the initial area information.

6. The video game processing apparatus according to claim 5, wherein the controller deletes update content of the player character related information that has been carried out since it is determined to use the initial area information when the controller terminates the control using the initial area information.

7. The video game processing apparatus according to claim 1, wherein the initial area information and the latest area information are stored separately, thereby enabling capture or replay of an area which has been previously captured or played.

8. The video game processing apparatus according to claim 1, wherein a state of the selected area is changed in response to the operation by the player such that the controller updates the latest area information.

9. The video game processing apparatus according to claim 1, wherein the video game processing apparatus is a server that provides the initial area information, the latest area information, and the player character related information to a video game terminal via a communication network.

10. The video game processing apparatus according to claim 1, wherein the memory in which the initial area information is stored is a cache memory.

11. The video game processing apparatus according to claim 1, wherein, when the determination result is to use the initial area information, the player character is returned to a state before the initial area information is used after the progressing of the game.

12. The video game processing apparatus according to claim 1, wherein, when the determination result is to use the initial area information, the controller does not influence a main story of the video game.

13. The video game processing apparatus according to claim 1, wherein items owned by the player character are not reduced when the determination result is to use the initial area information.

14. The video game processing apparatus according to claim 1, wherein a level and a maximum health point of the player character are maintained when the determination result is to use the initial area information.

15. The video game processing apparatus according to claim 1, wherein the game is progressed in the selected area using the current player character related information when the determination result is to use the latest area information, with the current player character related information being different than initial player character related information of the player character from before the player character progresses to the gate.

16. The video game processing apparatus according to claim 15, wherein a level of the player character in the current player character related information is different than a level of the player character in the initial player character related information.

17. A non-transitory computer-readable medium including a video game processing program product causing a video game processing apparatus to control progress of a video game, the video game processing program causing the video game processing apparatus to execute:

controlling progress of the video game;

updating latest area information corresponding to the plurality of areas in accordance with progress of the video game, the latest area information being stored in a memory, the latest area information indicating a progress status of the video game in each of a plurality of areas indicated by initial area information, the initial area information being stored in the memory, the initial area information indicating an initial state of each of the plurality of areas, wherein a player character can move on the plurality of areas;

displaying each of the plurality of areas on a display, the display graphically indicating a relationship between the plurality of areas, at least one gate connecting a first group of the plurality of areas with a second group of the plurality of areas, the second group of the plurality of areas being selectable by an operation of a player when the player character progresses to the gate, the first group of the plurality of areas being revisitable by the operation of the player when the player character progresses to the gate;

determining whether to use the initial area information or the latest area information in response to the operation of the player character corresponding to a selected area of the plurality of areas, the initial area information being usable when the player character progresses to the gate and the selected area is in the first group of the plurality of areas; and progressing the game in the selected area using a corresponding one of the initial area information and the latest area information in response to a determination result of the determining, the selected area being progressed using current player character related information stored in the memory;

updating player character related information stored in the memory in accordance the progressing of the game in the selected area only when the determination result is to use the latest area information.

18. The video game processing program product according to claim 17, wherein the initial area information and the latest area information are stored separately, thereby enabling capture or replay of an area which has been previously captured or played.

19. The video game processing program product according to claim 17, wherein a state of the selected area is changed in response to the operation by the player such that the controller updates the latest area information.

20. A method for controlling progress of a video game, the method comprising:

storing player character related information in a memory, the player character related information changing in accordance with progress of the video game;

storing initial area information in the memory, the initial area information indicating an initial state of each of a plurality of areas, wherein a player character can move on the plurality of areas;

storing latest area information in the memory, the latest area information indicating a progress status of the video game in each of the plurality of areas indicated by the initial area information;

controlling the progress of the video game with a controller, the controller:

updating the latest area information of the plurality of areas in accordance with the progress of the video game;

displaying each of the plurality of areas on a display, the display graphically indicating a relationship between the plurality of areas, at least one gate connecting a first group of the plurality of areas with a second group of the plurality of areas, the second group of the plurality of areas being selectable by an operation of a player when the player character progresses to the gate, the first group of the plurality of areas being revisitable by the operation of the player when the player character progresses to the gate;

determining whether to use the initial area information or the latest area information corresponding to a selected area in response to a selected operation of the player character, the initial area information being usable when the player character progresses to the gate and the selected area is in the first group of the plurality of areas;

progressing the game in the selected area using a corresponding one of the initial area information and the latest area information in response to a determination result of the determining, the selected area being progressed using current player character related information stored in the memory; and updating the player character related information in the memory in accordance with the progressing of the game in the selected area only when the determination result is to use the latest area information.

* * * * *